A. R. BLEWETT.
MOTOR VEHICLE.
APPLICATION FILED JULY 5, 1917.

1,282,033.

Patented Oct. 22, 1918.
2 SHEETS—SHEET 1.

Inventor
Arthur R. Blewett

A. R. BLEWETT.
MOTOR VEHICLE.
APPLICATION FILED JULY 5, 1917.

1,282,033.

Patented Oct. 22, 1918.
2 SHEETS—SHEET 2.

Inventor
Arthur R. Blewett

By Herbert E. Smith
Attorney

UNITED STATES PATENT OFFICE.

ARTHUR R. BLEWETT, OF PENDLETON, OREGON.

MOTOR-VEHICLE.

1,282,033.   Specification of Letters Patent.   Patented Oct. 22, 1918.

Application filed July 5, 1917. Serial No. 178,848.

*To all whom it may concern:*

Be it known that I, ARTHUR R. BLEWETT, a citizen of the United States, residing at Pendleton, in the county of Umatilla and State of Oregon, have invented certain new and useful Improvements in Motor-Vehicles, of which the following is a specification.

The present invention relates to improvements in motor vehicles, and particularly to the propelling or power driving mechanism as applied to farm implements, tractors, trucks, etc. The invention is particularly applicable to three wheel vehicles of this type wherein the power is applied to the front steering wheel, and the invention is designed to overcome certain objectionable features frequently found in such implements now in use. Although the steering wheel herein is illustrated in the front part of the implement it will of course be understood that the wheel may be located at the rear, but in any event, it has been found that without power applied to the steering wheel, said wheel has a tendency to work down the grade when the implement is traveling along a hillside. but by applying the power to the steering wheel the wheel will have a tendency to climb the grade, or at least follow a true line. The present invention resides essentially in the mechanism provided by which the steering wheel may be operated freely to guide the implement, and at all times be driven by the power mechanism regardless of the position of the wheel.

In the accompanying drawings I have illustrated one complete example of the physical embodiment of my invention constructed according to the best mode I have so far devised for the practical application of the principles of my invention.

Figures 1, 2, 5:
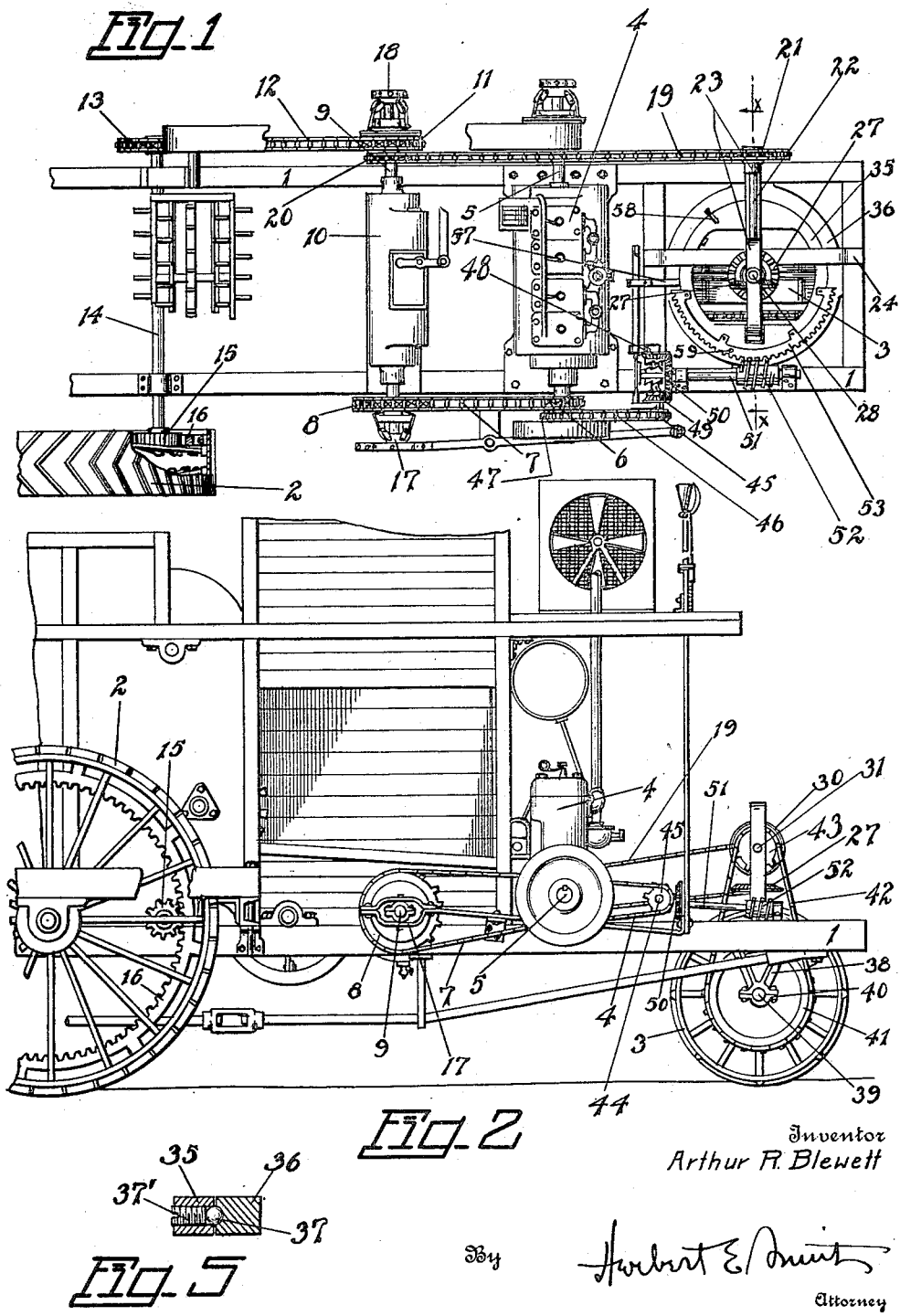
Figure 1 is the plan view of so much of an agricultural implement (harvester) as is necessary to illustrate my invention.
Fig. 2 is a side elevation of the machine of Fig. 1.
Fig. 5 is an enlarged sectional detail view on line X—X of Fig. 1.
Figure 3:
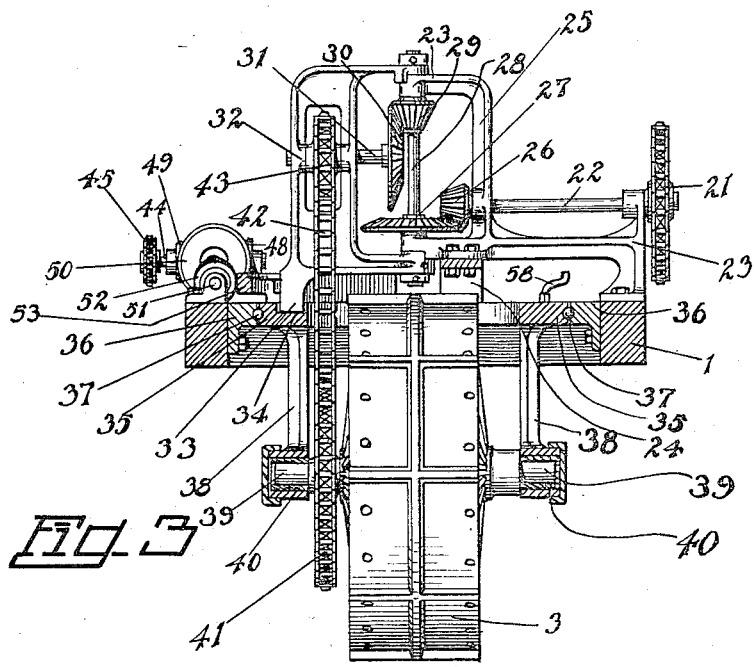
Fig. 3 is an enlarged vertical sectional view on line X—X of Fig. 1.

As a practical exemplification of my invention I have illustrated a type of combined harvester of which the frame is indicated at 1, the two rear "bull" wheels as 2, and the front steering wheel as 3. The "bull" wheels or traction wheels are driven from the gasolene motor 4 through the engine shaft 5, sprocket wheel 6 on the shaft and sprocket chain 7 which engages the sprocket wheel 8 on the transmission shaft 9 supported in the casing 10. From the transmission shaft which has a driving sprocket 11 the sprocket chain 12 drives the sprocket wheel 13 on the counter shaft 14, which is journaled in the frame 1 and has a driving pinion 15 to drive the bull wheel through the internal rack or toothed ring 16, and in this manner power is applied to drive the implement, the power being controlled by the clutch device 17 (Fig. 1), and the transmission being controlled by the clutch 18 at the opposite end of the transmission shaft.

The front steering wheel is also driven from the transmission shaft, a sprocket chain 19 being employed which is passed over the wheel 20 on the transmission and the wheel 21 on the forward counter shaft 22. This latter shaft is transversely arranged and journaled in a bracket 23 which is rigidly supported on one of the frame side bars and also on a longitudinally disposed brace 24. The bracket is fashioned with a vertically disposed yoke 25 and the inner end of the shaft 22 is provided with a bevel pinion 26 which engages a large bevel gear 27 horizontally disposed on the vertical shaft 28 which is journaled in the yoke and has an upper bevel pinion 29 meshing with a vertically disposed bevel gear 30 on the horizontally arranged shaft 31 which is journaled in the swiveled yoke 32. This yoke is swiveled on the vertical shaft 28 and the shaft is located at the center of the axis of the steering wheel so that the yoke will adapt itself and swing on its pivot shaft with the same center of movement as the steering wheel.

The yoke has a lug 33 which fits in a depression 34 in a revoluble ring 35 which forms a "fifth wheel" construction in connection with the fixed ring 36 secured to the frame, ball bearings being provided at 37 between the rings as in Fig. 5, where the opening through which the bearing balls are introduced is closed by a screw plug 37′. The steering wheel is journaled in a pair of hangers or arms 38 38 integral with and depending from the revoluble ring 35, and the trunnions 39 of the wheel are supported in bearings 40 as shown. One of the trunnions has a large sprocket wheel 41 over which the sprocket chain 42 passes and this chain also passes over the smaller sprocket wheel 43 on the shaft 31 in the swiveled yoke. This mechanism completes the driving elements for the front or steering wheel and said wheel is driven from the transmission casing as described.

Figure 4:
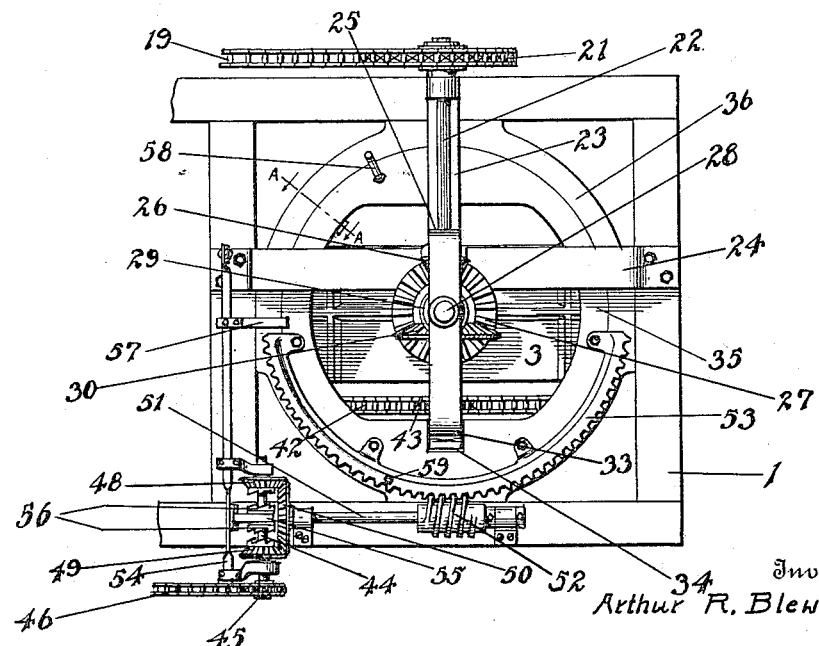
Fig. 4 is a top plan view of the "fifth wheel" construction including the steering wheel, its operating mechanism, and its driving mechanism.

The steering wheel is also operated by power to guide the implement, which power is taken direct from the engine shaft. For this purpose a clutch shaft 44 supported transversely of the frame at the side of the steering wheel is driven through the medium of its sprocket wheel 45, the chain 46 and the sprocket wheel 47 on the engine shaft. A pair of clutch pinions 48 and 49 are continuously engaging the clutch gear 50 on the longitudinally arranged worm shaft 51, and the worm 52 on this shaft is in engagement with the rack ring or segment 53 attached to the revoluble ring 35. Now by movement of the shift bar 54, which has a clutch fork 55 engaging the clutch member 56, either one of these pinions 48 49 may be engaged to drive forward or reverse the large bevel gear 50 thus turning the steering wheel to the right or left as desired. A tappet 57 on the shift bar is in the path of movement of two pins 58 and 59 carried by the revoluble ring 35 to throw the steering clutch into neutral position (as shown in Fig. 4) to guard against and prevent accidental continued turning of the steering wheel and mechanism should the driver not have control of the mechanism.

Thus regardless of the position of the steering wheel, whether in line, or at an angle to the frame, a uniformity of power is continuously applied to the wheel because of the swivel movement of the described connections, thus obviating and eliminating twisting strains upon the driving and steering parts.

What I claim is:—

1. The combination with the supporting frame, a revoluble member and steering means applied thereto, of a wheel supported on said member and mechanism supported on said frame including a vertical shaft coincident with the diameter of said wheel, a yoke swiveled on said shaft and attached to said revoluble member, and driving connections operated from said shaft and supported on the yoke for driving the steering wheel.

2. The combination with a supporting frame, a revoluble ring and means for turning it, and a steering wheel supported in the ring, of mechanism supported on the frame including a vertical shaft coincident with the vertical diameter of the steering wheel, a yoke swiveled on said shaft and connected with the ring, a shaft in the yoke with a sprocket wheel thereon, a sprocket chain, a sprocket wheel revoluble with the steering wheel, and means for operating the vertical shaft.

3. The combination with a revoluble ring and its steering wheel, a rack on the ring, a worm screw engaging the rack and a steering shaft, a gear on the shaft and a pair of clutch pinions adapted to selectively engage said gear, and automatic means comprising a pair of spaced pins on the ring, a shift bar, and a tappet thereon, actuated by excessive movement of said ring for throwing the clutch pinions to neutral.

In testimony whereof I affix my signature.

ARTHUR R. BLEWETT.